United States Patent
Gollwitzer et al.

(10) Patent No.: US 6,847,642 B2
(45) Date of Patent: Jan. 25, 2005

(54) SWITCHING SYSTEM WITH IMPROVED MESSAGE DISTRIBUTOR

(75) Inventors: Hermann Gollwitzer, Hausham (DE); Kurt Ramsdorf, Munich (DE); Karl Sapotta, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 792 days.

(21) Appl. No.: 09/853,055

(22) Filed: May 10, 2001

(65) Prior Publication Data

US 2002/0024962 A1 Feb. 28, 2002

(30) Foreign Application Priority Data

May 10, 2000 (DE) .......................................... 100 22 764

(51) Int. Cl.[7] .............................................. H04L 12/28
(52) U.S. Cl. ........................................ 370/389; 370/351
(58) Field of Search ............................. 370/351–3, 389, 370/392, 409, 467, 438, 360

(56) References Cited

U.S. PATENT DOCUMENTS

| 6,424,659 | B2 | * | 7/2002 | Viswanadham et al. ..... 370/469 |
| 6,639,981 | B1 | * | 10/2003 | Dunn et al. ............. 379/221.13 |
| 6,697,345 | B1 | * | 2/2004 | Corrigan et al. ............. 370/330 |
| 6,735,441 | B1 | * | 5/2004 | Turgeon et al. ............. 455/433 |

* cited by examiner

Primary Examiner—David Vincent
(74) Attorney, Agent, or Firm—McCormick, Paulding & Huber LLP

(57) ABSTRACT

In a switching system with improved message distributor in which a common internal bus is used in order to improve the transmission of messages between a switching network connecting unit, a coordination processor connecting unit and a signaling connecting unit are provided. In this way, loading on the co-ordination processor can be reduced and the system power of the switching system can be increased.

13 Claims, 6 Drawing Sheets

SWITCHING SYSTEM WITH IMPROVED MESSAGE DISTRIBUTOR

BACKGROUND OF THE INVENTION

The present invention relates to a switching system with an improved message distributor, and in particular to a digital switching system with a message distributor for improved distribution of signaling messages, control messages for respective units of the switching system and of messages for the connection set up and release.

FIG. 1 shows a telecommunication system with a conventional switching system such as is implemented by the Siemens EWSD system, for example.

According to FIG. 1, such a conventional switching system comprises essentially of a line group 1 (LTG, line/trunk group) which implements, together with digital subscriber line units 2 (DLU, digital line unit), so-called connecting units for connecting subscriber terminals 3 and 4 which are to be switched. The subscriber terminals 3 and 4 can be connected either directly to the line group 1 here, or via the digital subscriber line units 2. The subscriber terminals 3 and 4 are, for example, analog or digital terminals, ISDN basic accesses, connections for smaller and medium-sized private switching systems etc. In order to switch or implement communication between the respective subscriber terminals 3 and 4, the switching system usually has a switching network 7 which preferably has a redundant switching network 7' in order to avoid failures. In the switching network 7 and 7' (SN), not only are the voice and data channels of the respective subscriber terminals 3 and 4 connected to one another but there is also communication between and control of respective units such as, for example, the line group 1 and the respective subscriber line unit 2.

In order to implement a signaling network which is superimposed on a user channel network, the conventional switching system according to FIG. 1 also has a signaling control unit 5 (CCNC, common channel signaling network control). The signaling network of the central signaling system No. 7 (CCS7, common channel signaling No. 7) is preferably controlled by the signaling control unit 5. The signaling messages transmitted in the signaling network do perform here the essential basis for the actual switching or coupling of the associated voice and data channels in a user channel network.

A switching control unit 6 and its redundant unit 6' are used for centrally controlling the switching system. The switching control unit 6 or 6' comprises essentially a message distributor 8 or distributor 8' (MB, message buffer) which is not illustrated, for distributing the messages transmitted in the switching system. Such messages are, for example, signaling messages (CCS7 messages), control messages for controlling the digital subscriber line units 2, the line groups 1 and the switching network 7, 7'. The message buffer or distributor 8 is also connected for this purpose to a switching group control 10 (SGC) which carries out the actual actuation of the switching network 7, 7'. In addition, the messages distributed by the message distributor 8 are used for connecting setup and release and for software download for possible restarting of the system. The connection of the message distributor 8 to the switching network 7 is preferably implemented by means of HDLC interfaces each with a data rate of 64 kbit/s. The switching control unit 6 or 6' not only has the message distributor 8 but also a co-ordination processor 9 (CP) for implementing actual routing and zoning by actuating the message distributor 8 and the signaling control unit 5. The connection of the signaling control unit 5 is preferably implemented here by means of an asynchronous interface ATM (asynchronous transfer mode). The co-ordination processor 9 has essentially a common memory 12 (CMY) and a switching processor 11 (CAP, call processor) which carry out the actual controlling of the switching processes.

A disadvantage in such a conventional switching system is, however, the extremely high loading of the co-ordination processor 9 which results, in particular, from the processing and passing on of signaling messages from the message distributor 8 to the signaling control unit 5. This results, particularly when implementing mobile phone systems in which mobile phone stations are connected to the respective line group 1, in a limitation to only 32 line groups because increased signaling occurs owing to the permanent cell transfer in mobile phone systems.

SUMMARY OF THE INVENTION

It is an object of the invention, therefore, to provide a switching system whose system power is significantly improved. The intention is in particular to provide a switching system which can make available a higher number of services and which can cope with increased signaling volume without difficulty.

This object is achieved according to the invention by a switching system comprising at least one connecting unit for connecting subscriber terminals which are to be switched. A signaling control unit is provided for controlling the signaling network. A switching control unit controls the switching system. A switching network is provided for implementing communication between the subscriber terminals and the connecting, signaling control, and switching control units of the switching system. The switching control unit comprises a message distributor for distributing signaling messages for the signaling network and control messages for the connecting, signaling control, and switching control units of the switching system. A coordination processor is provided for implementing routing and zoning by actuating the message distributor in the signaling control unit. The message distributor comprises an internal bus for directly connecting the signaling control unit to the switching network.

In a method of the invention, a switching system is provided having at least one connecting unit for connecting subscriber terminals which are to be switched. A signaling network is controlled by a signaling control unit. The switching system is controlled by a switching control unit. Communication is implemented by a switching network between the subscriber terminals and the connecting, signaling control and switching control units of the switching system. Signal messages are distributed for the signaling network and control messages are distributed for the connecting, signaling control, and switching control units of the switching units. Routing and zoning is implemented by a coordination processor by actuating the message distributor and the signaling control unit. The message distributor is provided with an internal bus for directly connecting the signaling control unit to the switching network.

In particular the use of a message distributor with an internal bus for directly connecting the signaling control unit to the switching network significantly relieves the loading on the co-ordination processor, as a result of which the performance of the system is significantly improved. Even when there is an increased signaling volume, such as is caused for example, by mobile phone systems, a connection set up or release can thus be carried out at any time.

Furthermore, more services can be made available, which permits improved use of a D channel in the ISDN system, for example. In addition, in this way, for the first time up to 2016 line groups can be actuated and administered by one message distributor.

The message distributor preferably has a switching network connecting unit, a co-ordination processor connecting unit and a signaling connecting unit which are connected to one another via the internal bus. In this way, the message distributor can be of cost-effective design. In addition, the connecting units are implemented by means of a plurality of subscriber line modules, enabling the message distributor to be accommodated within one module frame and connection to be effected via a common module back wall by means of the internal bus.

Each subscriber line module has, for example, a plurality of identical I bus modules with associated memory modules. This enables a significant simplification of the respective modules to be achieved and the manufacturing costs to be significantly reduced.

In particular by implementing the I bus modules and at least a portion of a co-ordination processor module, signaling or switching network interface module in a common ISIC (user-specific integrated circuit) permits a further cost reduction and modular design when implementing the message distributor in the switching system.

The invention is explained in more detail below by means of an exemplary embodiment and with reference to the drawings.

DESCRIPTION OF THE PREFERRED EMBODIMENTS

Figure 1:
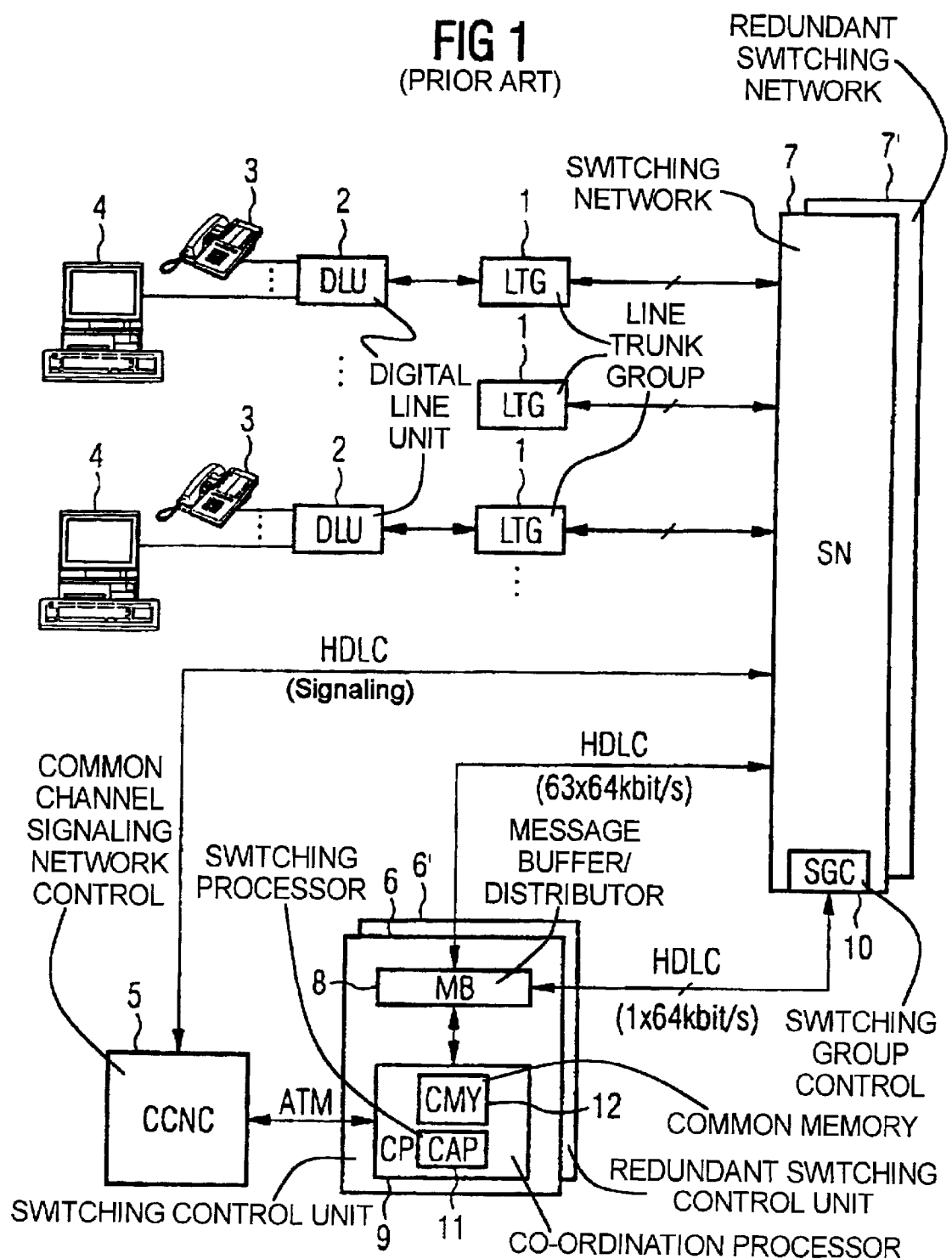
FIG. 1 shows a simplified block diagram view of a communication system with a switching system of the prior art.

For the purposes of promoting an understanding of the principles of the invention, reference will now be made to the preferred embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
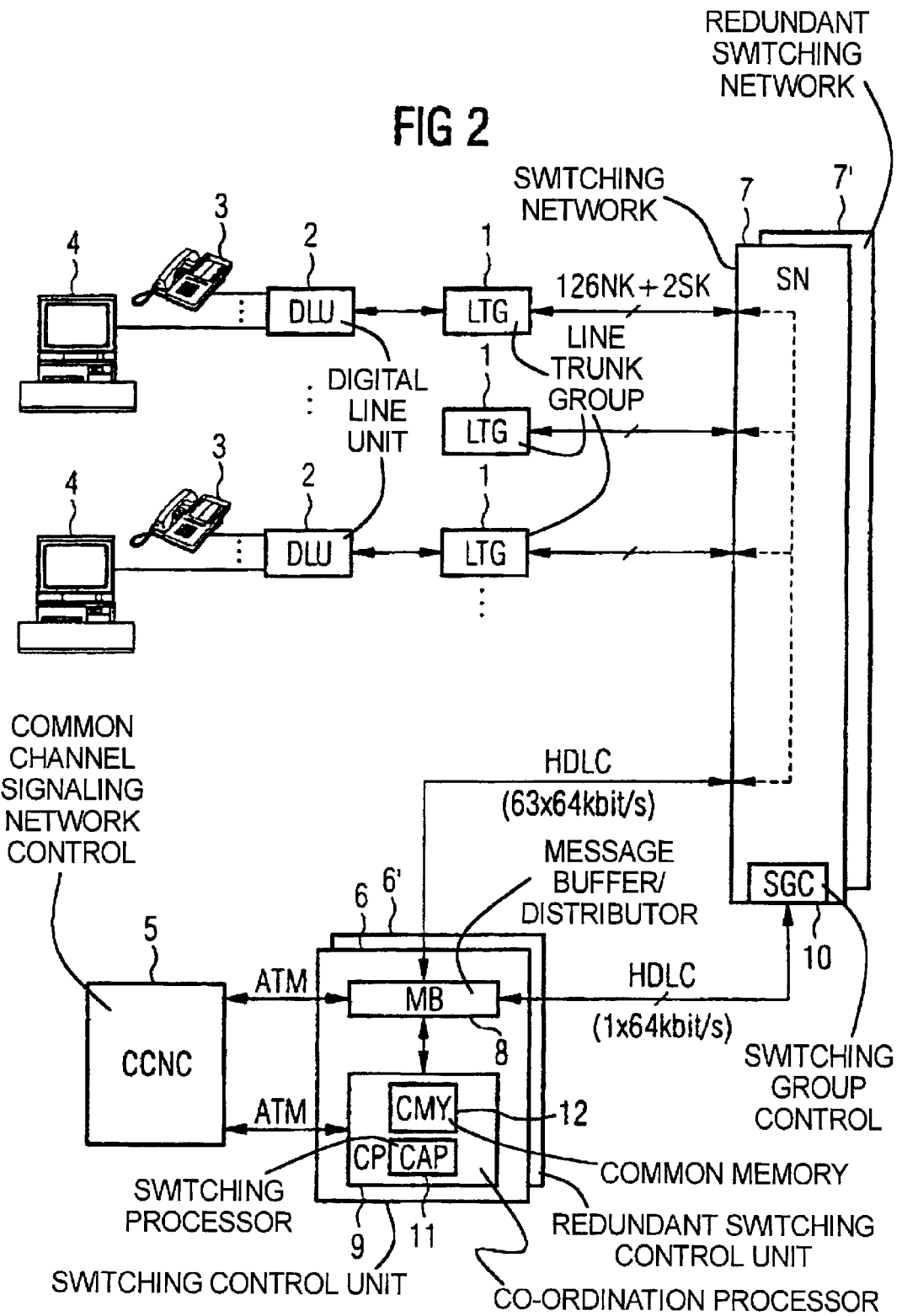
FIG. 2 shows a simplified block diagram view of a communication system with a switching system according to the invention.

FIG. 2 shows a simplified block diagram view of a communications system with a switching system according to the invention, identical reference symbols designating identical or similar implementations to those in FIG. 1. For this reason a detailed description is not given below in order to avoid repetition.

The telecommunications system according to FIG. 2 corresponds essentially to the conventional telecommunications system according to FIG. 1, the switching system according to the invention comprised of the units 1, 2, 5, 6 and 7 differing essentially from the conventional switching system according to FIG. 1 by having a modified message distributor 8. In contrast to the conventional switching system according to FIG. 1, the switching system according to the invention according to FIG. 2 specifically has a message distributor 8 with an internal bus which directly connects the switching network 7 or 7' to the signaling control unit 5. To be more precise, in the communication system according to FIG. 2, signaling messages are transmitted directly from the signaling control unit 5 via an asynchronous interface ATM to the message distributor 8 or 8' and are passed on there directly to the switching network 7 or 7' via the internal bus and a HDLC interface, or to its switching group control 10 and to a respective line group 1.

The signaling messages consequently no longer have to be passed on via the co-ordination processor 9, as in the conventional switching system according to FIG. 1 This significantly relieves the loading on the computational power (switching power) in the co-ordination processor. Owing to the reduced loading in the co-ordination processor, the performance of the switching system can therefore be improved, as a result of which, for example, more services can be made available, improved use of the signaling channel (D channel) in the ISDN system can be achieved or an increased number of line groups is made possible when using the mobile phone system.

The method of operation of the switching system according to FIG. 2 can be based here essentially on the method of operation of the conventional switching system according to FIG. 1, for which reason a detailed description is not given below. Because the signaling messages (switching network 7<->signaling control unit 5) which are directly connected through by the message distributor 8 have approximately 35% of all messages to be distributed, a significant improvement of the system performance is obtained owing to the more rapid processing in the message distributor 8.

In addition, in the conventional switching system according to FIG. 1 or the conventional message distributor, it was only possible to connect through messages within a group of 63 line groups. The entire remaining message traffic had to be again processed via the co-ordination processor 9. By using the internal bus according to the invention within the message distributor 8 it is now possible for the entire message distribution (switching network 7<->switching network 7) between the line groups 1 to be processed without using the co-ordination processor 9, thus resulting in a further improvement of the system performance. Only the remaining 15% of the message traffic to be handled by the message distributor (switching network 7<->coordination processor 9) is directly handled via the coordination processor in the inventive switching system or, respectively, the improved message distributor 8 belonging thereto. It is therefore essentially control messages for driving the line/trunk groups 1 of the switching network 7 or, respectively, of the switching group control 10 that are affected. This results in an improvement in the system performance and a relieving of the loading on, in particular, the switching processor 11 by up to 85% with respect to the prior art according to FIG. 1.

Figure 3:
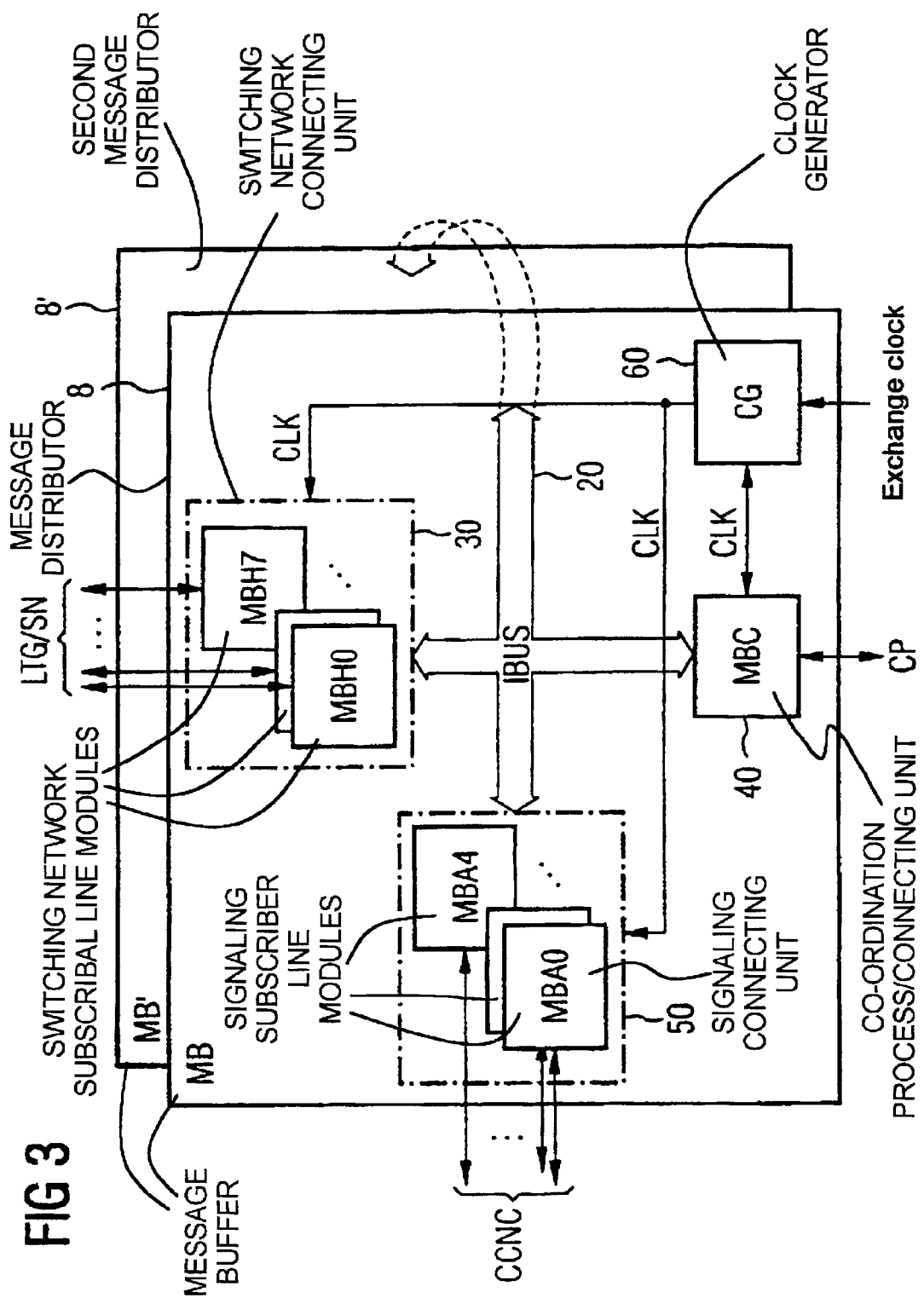
FIG. 3 shows a simplified block diagram view of a message distributor in the switching system according to FIG. 2.

FIG. 3 shows a simplified block view of the message distributor 8 used in FIG. 2. For reasons of redundancy, a second message distributor 8' can be used which in the case of a fault performs the functions of the failed message distributor 8. The message distributor 8 or 8' (MB or MB', message buffer) serves essentially for distributing messages within the co-ordination processor 9, the switching network 7 or the line groups 1 and the signaling control unit 5. The connection between the message distributor 8 and the switching network 7 or the line groups 1 is preferably implemented via a HDLC interface with 63 channels of 64/128 kbit/s data width for each. In addition, the message distributor 8 has a HDLC interface with a channel and a data rate of 64/128 kbit/s for the switching group control 10, as a result of which the switching network 7 or 7' is controlled, i.e. routing, monitoring, etc. are carried out.

According to FIG. 3, this interface is implemented by means of a switching network connecting unit 30 for connecting the message distributor 8 or 8' to the switching network 7 or 7'. In order to connect the message distributor 8 or 8' to the co-ordination processor 9, the message distributor 8 also has a coordination process or connecting unit 40. In addition, the message distributor 8 has a signaling connecting unit 50 for connecting the message distributor 8 to the signaling control unit 5. This connection is preferably implemented by means of an asynchronous interface ATM (asynchronous transfer mode).

The respective connecting units 30, 40 and 50 are connected to one another within the message distributor 8 or 8' via an internal bus 20, as a result of which the signaling control unit 5 is directly connected to the switching network 7. The message distributor 8 is also connected to its redundant message distributor 8' via the internal bus 20 here. A clock generator 60 (CG) supplies the respective connecting units 30, 40 and 50 with a common clock CLK. This clock CLK is preferably derived from an exchange clock which is usually generated in the co-ordination processor 9.

According to FIG. 3, the switching network connecting unit 30 comprises a plurality of a plurality of switching network subscriber line modules MBH0 to MBH7 which are in turn connected to one another via the internal bus 20 (not illustrated). In a similar way, the signaling connecting unit 50 comprises a plurality of signaling subscriber line modules MBA0 to MBA4 which are in turn connected to one another via the internal bus 20 (not illustrated). The co-ordination processor connecting unit is implemented according to FIG. 3 by means of a single co-ordination processor subscriber line module MBC. Because the respective subscriber line modules are connected to one another by means of the internal bus 20, according to the invention not only a 100% of all the signaling messages but also a 100% of the entire message traffic to the line groups 1 can be distributed via the message distributor 8 without loading the coordination processor 9. In addition, when the message distributor 8 is implemented in a module frame with a plurality of modules of similar design, the line units of the co-ordination processor 9, of the signaling control unit 5 and of the switching network 7 can be connected to one another via an internal bus 20, which is preferably located in a common back wall of a module frame. In the switching system according to the invention, the redundant message distributor 8' is located in a corresponding module frame, the respective module frame being connected in turn via the internal bus 20. In this way, for the first time up to 2016 line groups 1 can be connected to a switching network and administered using the message distributor 8 or 8'.

Figure 4:
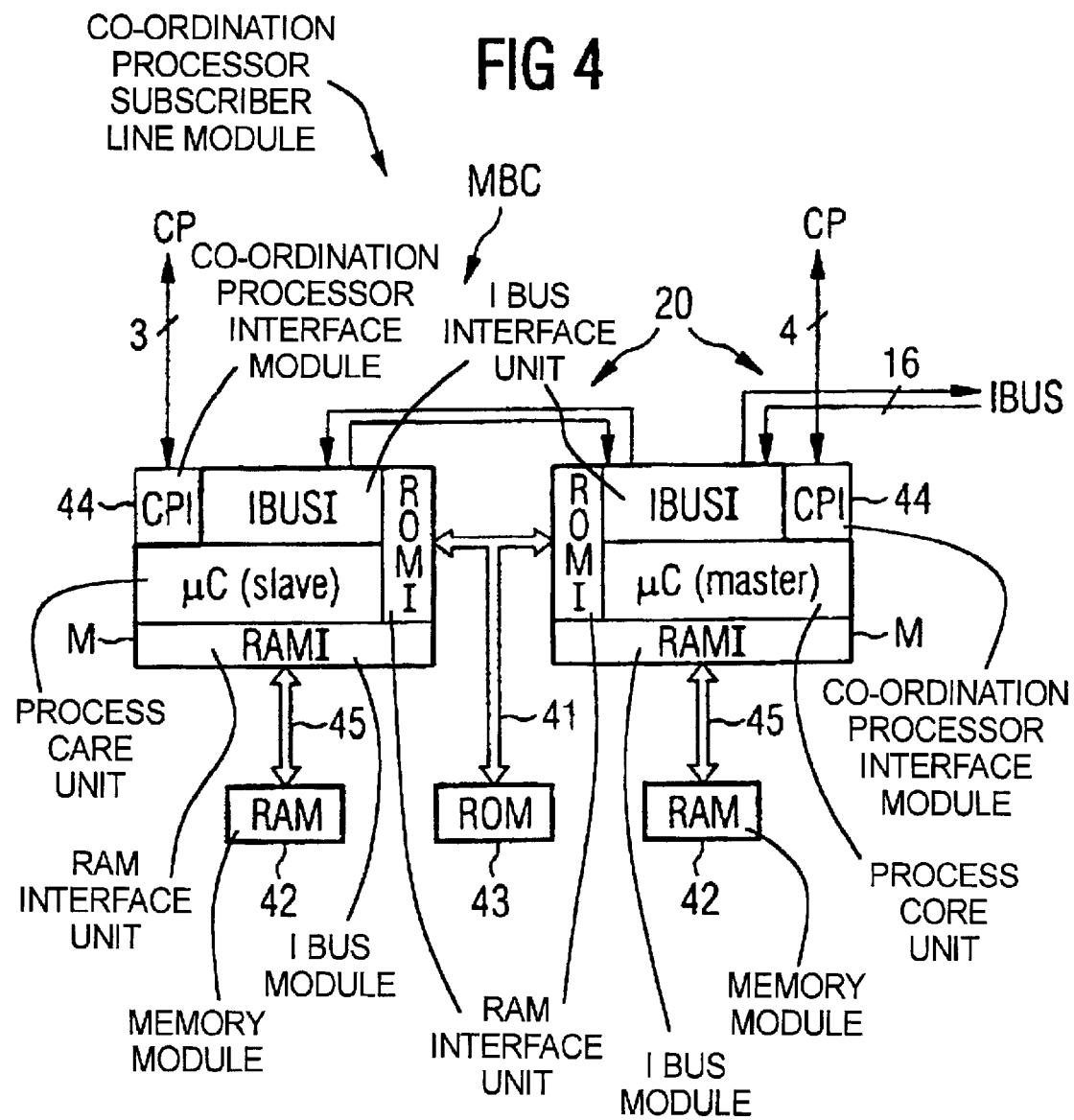
FIG. 4 shows a simplified block diagram view of a co-ordination processor subscriber line module of the message distributor according to FIG. 3.

FIG. 4 shows a simplified block view of the co-ordination processor subscriber line module MBC. Identical reference symbols designate identical or similar elements and a repeated description is therefore not being given below.

According to FIG. 4, the co-ordination processor subscriber line module MBC is comprised essentially of two I bus modules M with associated memory modules 42 and 43 and two co-ordination processor interface modules 44 for implementing a physical interface to the coordination processor 9. The I bus modules M each operate here in a "master" and "slave" mode and have essentially a processor core unit $\mu c$ for carrying out data processing, a RAM interface unit RAMI for implementing an interface 45 to a memory module 42 (RAM) with random memory access, a ROM interface unit ROMI for implementing an interface 41 to a memory module 43 (ROM) with read only access, and an I bus interface unit IBUSI for implementing an interface for the internal bus 20. The processor core unit $\mu c$ is preferably comprised of a RISC processor core with an instruction cache, a data cache and an integrated memory. The RAM interface unit RAMI is preferably comprised of an arbitration unit and a memory control unit, SDRAMs being preferably used for the memory modules 42. The ROM interface unit ROMI is essentially implemented by means of the commonly used data cache and instruction cache of the processor core unit $\mu c$. The I bus interface unit IBUSI is preferably comprised of an I bus interface for implementing the internal bus 20 and a switching unit for activating or selecting the internal bus within a module (intraboard) or outside a module (interboard).

Figure 5:
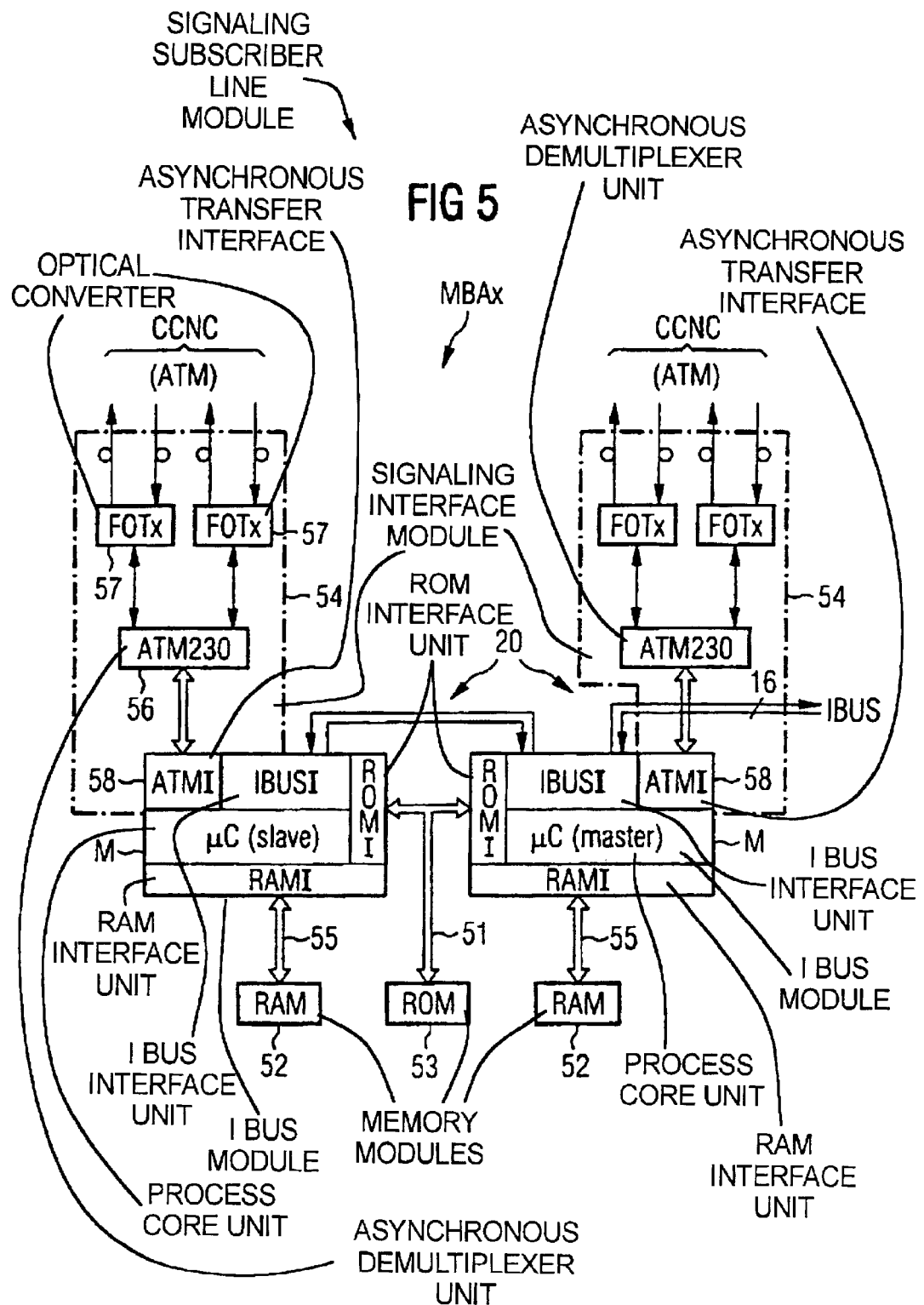
FIG. 5 shows a simplified block diagram view of a signaling subscriber line module of the message distributor according to the FIG. 3.

FIG. 5 is a simplified block view of a signaling subscriber line module MBAx (illustrated in FIG. 3), identical reference symbols designating in turn identical or similar elements. A repeated description is not being given below.

According to FIG. 5, each signaling subscriber line module MBA0 to MBA4 is again comprised in each case of two I bus modules M with the associated memory modules 52 (RAM) and 53 (ROM). The I bus modules M have the same structure here as in FIG. 4, for which reason a repeated description is not given below. However, instead of the co-ordination processor interface module 44 there is now a signaling interface module 54 at the I bus module M, resulting in the implementation of a physical interface to the signaling control unit 5. According to FIG. 5, these signaling interface modules 54 are each comprised of an asynchronous transfer interface 58 (ATMI, asynchronous transfer mode interface) which is connected to an asynchronous demultiplexer unit 56 (ATM 230). Optical converters 57 (FOTx, fiber optic transmission) are preferably connected to the asynchronous demultiplexer unit 56, resulting in an optical interface in the asynchronous transfer mode (ATM) to the signaling control unit 5 (CCNC). The two I bus modules M are operated here in turn in a "master" mode and a "slave" mode, resulting in a hierarchical structure. The connection within the module MBAx and to other modules MBAy (x≠y) of the signaling connecting unit 50 is in turn implemented by means of the internal bus 20 either "intraboard" or "interboard".

Figure 6:
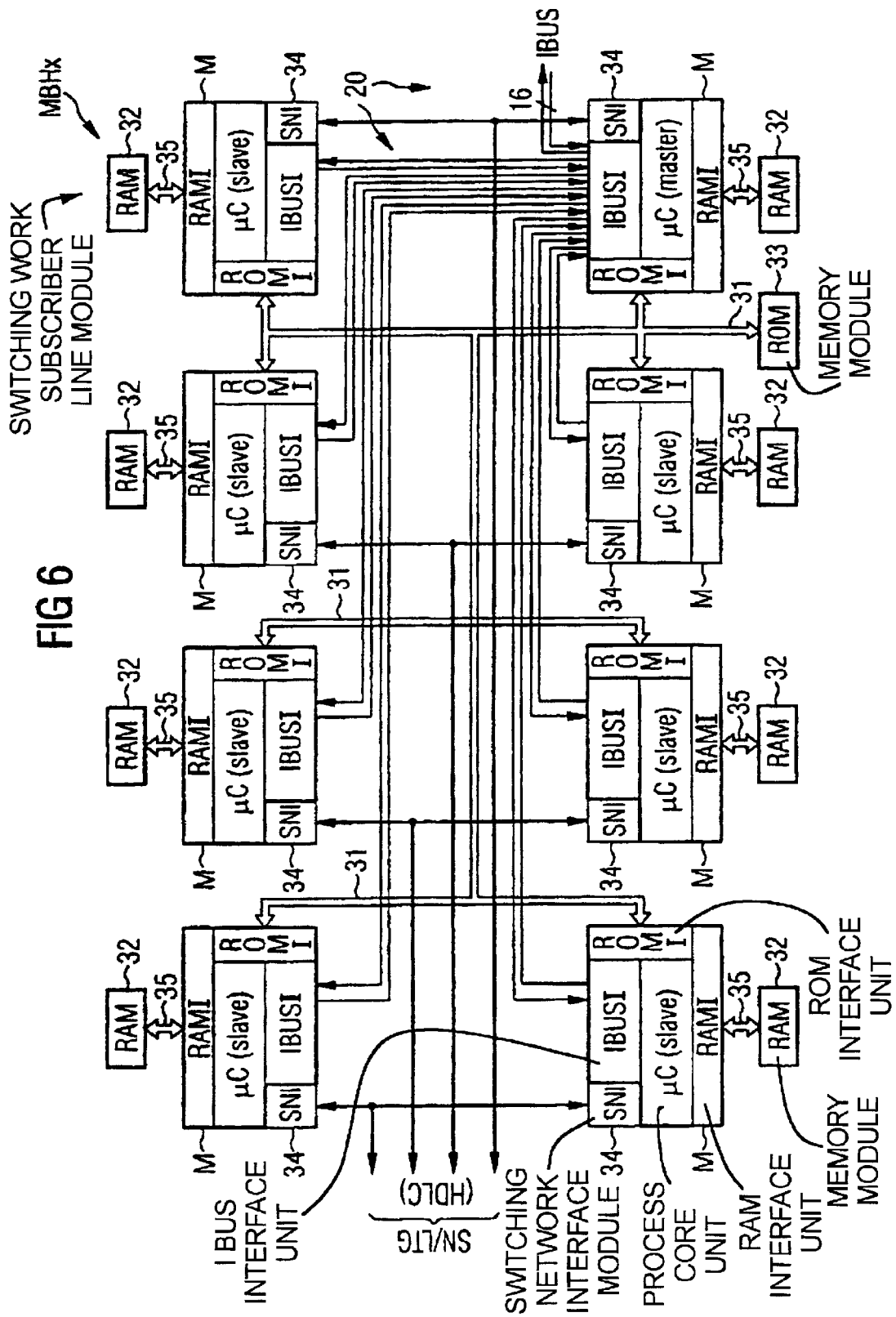
FIG. 6 shows a simplified block diagram view of a switching network subscriber line module of the message distributor according to FIG. 3.

FIG. 6 shows a simplified block diagram view of a respective switching network subscriber line module MBHx for implementing a physical interface to the switching network 7 or to its switching control 10. Identical reference symbols designate here in turn identical or similar elements, for which reason a repeated description is not given below.

According to FIG. 6, each switching network subscriber line module MBHx preferably comprises eight I bus modules M with their associated memory modules 32 (RAM) and 33 (ROM). In order to specifically implement the physical interface to the switching network 7 or 7', a switching network interface module 34 (SNI) is now located in each of the I bus modules M. The I bus modules M have here in turn the same structure as the I bus modules according to FIG. 4 and FIG. 5, for which reason a detailed description is not given below.

The switching network interface modules 34 preferably implement a HDLC protocol with a data rate of 64/128 kbit/s, according to the conventional interface as in FIG. 1. However, other protocols may also be used to implement this interface. According to FIG. 6, all eight I bus modules with their respective switching network interface modules 34 have a common memory module 33 (ROM) with read only access, while otherwise each I bus module M has, in each case, a separate memory module 32 (RAM) for random read/write access. In addition, the eight I bus modules with their associated switching network interface modules 34 are operated in a "master/slave" mode in order to implement an unambiguous hierarchical structure, one module being properly operated in a "master" mode and the others operating in a "slave" mode. In addition, the respective I bus modules M are connected via the internal bus 20 (intraboard), as a result of which 100% of all the messages can be distributed or connected through between respective line groups 1.

In particular, the use of essentially identical I bus modules M for the respective subscriber line modules MBC, MBAx and MBHx result in significant cost reductions in the manufacture of the message distributor 8. Particular cost advantages are obtained when the I bus modules M, and at least some of the coordinator processor, signaling or switching network interface module 34, 44 and 55 are implemented in a "user-specific integrated circuit" (ASIC), and the space requirements are reduced.

When such integration is carried out, the co-ordination processor interface module 44, for example, is connected directly to the RAM interface unit RAMI in order to implement the co-ordination processor subscriber line module MBC. In the same way, in a cost-effective ASIC implementation of the signaling subscriber line module MBAx, the asynchronous interface 58, for example, is connected both directly to the RAM interface unit RAMI and to the processor core unit μm and to the ROM interface unit ROMI via a processor-internal bus (not illustrated). Likewise, in a space-saving and cost-effective ASIC implementation of the switching network subscriber line modules MBHx, the respective switching network interface module 34 can in turn be connected directly to the RAM interface unit RAMI and to the processor core unit μc and to the ROM interface unit (ROMI) via a processor-internal bus (not illustrated) of the processor core unit μc. In this way, a message distributor 8 is obtained which is of modular design and which can be implemented in a particularly cost-effective and space-saving way.

According to FIGS. 4 to 6, the internal bus 20 preferably comprises of a plurality of, in each case, two connecting lines which essentially constitute a packet-oriented serial bus. In order to effect adaptation to respective system requirements, the data rate can be switched over here as desired in the internal bus 20, enabling interfaces with different data rates to be implemented. For example, in this way an interface to the switching network with a data rate of 128 or 64 kbit/s is obtained, also ensuring downward compatibility with conventional switching systems according to FIG. 1.

The invention has been described above with reference to specific interfaces and protocols. However, it is not restricted thereto and comprises all further possible interfaces and protocols which can be used in a switching system.

While the invention has been illustrated and described in detail in the drawings and foregoing description, the same is to be considered as illustrative and not restrictive in character, it being understood that only the preferred embodiment has been shown and described and that all changes and modifications that come within the spirt of the invention are desired to be protected.

We claim as our invention:

1. A switching system, comprising:
   at least one connecting unit for connecting subscriber terminals which are to be switched;
   a signaling control unit for controlling a signaling network;
   a switching control unit for controlling the switching system;
   a switching network for implementing communication between the subscriber terminals and the connecting, signaling control, and switching control units of the switching system;
   the switching control unit comprising a message distributor for distributing signaling messages for the signaling network and control messages for the connecting, signaling control, and switching control units of the switching system;
   a coordination processor for implementing routing and zoning by actuating the message distributor and the signaling control unit; and
   the message distributor comprising an internal bus for directly connecting the signaling control unit to the switching network.

2. The switching system of claim 1 wherein the message distributor has a switching network connecting unit for connecting the switching network;
   a coordination processor connecting unit for connecting the co-ordination processor; and
   a signaling connecting unit for connection of the signaling control unit, the internal bus connecting the switching network, coordination processor, and signaling connecting units to one another internally.

3. The switching system of claim 2 wherein the switching network connecting unit has a plurality of switching network subscriber line modules, the internal bus connecting the modules to one another.

4. The switching system of claims 2 wherein coordination processor connecting unit has a co-ordination processor subscriber line module.

5. The switching system of claim 2 wherein the signaling connecting unit has a plurality of signaling subscriber line modules, the internal bus connecting the modules to one another.

6. The switching system of claim 4 wherein the coordination processor subscriber line module has two I bus modules with associated memory modules and two co-ordination processor interface modules for implementing a physical interface to the co-ordination processor.

7. The switching system of claim 5 wherein the signaling subscriber line modules each have two I bus modules with associated memory modules and two signaling interface modules for implementing a physical interface to the signaling control unit.

8. The switching system of claim 3 wherein the switching network subscriber line modules each have eight I bus modules with associated memory modules and eight switching network interface modules for implementing a physical interface to the switching network.

9. The switching system of claim 6 wherein the I bus modules comprise:
- a processor core unit for carrying out data processing;
- a RAM interface unit for implementing an interface to a memory module with random memory access;
- a ROM interface unit for implementing an interface to a memory module with read only access; and
- an I bus interface unit for implementing an interface for the internal bus.

10. The switching system of claims 6 wherein the I bus modules and at least some of the coordination processor, signaling and switching network interface modules are implemented in an ASIC.

11. The switching system of claim 1 wherein the internal bus comprises a packet-oriented serial bus.

12. The switching system of claims 1 wherein a data rate in the internal bus is switched over.

13. A method for operating a switching system, comprising the steps of:
- connecting subscriber terminals which are to be switched with at least one connecting unit of the switching system;
- controlling a signaling network with a signaling control unit;
- controlling the switching system with a switching control unit;
- implementing communication between the subscriber terminals and the connecting, signaling control, and switching control units of a switching system with a switching network;
- distributing signaling messages with a message distributor of the switching control unit for the signaling network and control messages for the connecting, signaling control, and switching control units of the switching system;
- implementing routing and zoning with a coordination processor by actuating the message distributor in the signaling control unit; and
- directly connecting the signaling control unit to the switching network with an internal bus of the message distributor.

* * * * *